(12) United States Patent
Pearce et al.

(10) Patent No.: US 7,705,717 B2
(45) Date of Patent: Apr. 27, 2010

(54) METHOD AND APPARATUS FOR RECEIVING SIGNALS FROM A SENSOR INTO A TIRE PRESSURE MONITORING SYSTEM

(75) Inventors: Robert Pearce, Royal Oak, MI (US); Thomas McQuade, Ann Arbor, MI (US)

(73) Assignee: Ford Global Technologies, Dearborn, MI (US)

( * ) Notice: Subject to any disclaimer, the term of this patent is extended or adjusted under 35 U.S.C. 154(b) by 1174 days.

(21) Appl. No.: 11/164,624

(22) Filed: Nov. 30, 2005

(65) Prior Publication Data

US 2007/0120659 A1     May 31, 2007

(51) Int. Cl.
*B60C 23/00* (2006.01)
(52) U.S. Cl. .......................... 340/447; 340/442; 73/146
(58) Field of Classification Search ......... 340/442–447, 340/426.33; 73/146; 116/34 R, 34 A, 34 B
See application file for complete search history.

(56) References Cited

U.S. PATENT DOCUMENTS

| | | | |
|---|---|---|---|
| 1,948,427 A | 2/1934 | Moecker |
| 1,954,153 A | 4/1934 | Taylor |
| 2,274,557 A | 2/1942 | Morgan et al. |
| 2,578,358 A | 12/1951 | Jellison |
| 2,589,623 A | 3/1952 | Merritt et al. |
| 3,852,717 A | 12/1974 | Hosaka et al. |
| 3,911,855 A | 10/1975 | Haven |
| 3,965,847 A | 6/1976 | Deming |
| 3,974,477 A | 8/1976 | Hester |
| 4,051,803 A | 10/1977 | Arnone |
| 4,316,176 A | 2/1982 | Gee et al. |
| 4,376,931 A | 3/1983 | Komatu et al. |
| 4,443,785 A | 4/1984 | Speranza |
| 4,494,106 A | 1/1985 | Smith et al. |
| 4,510,484 A | 4/1985 | Snyder |
| 4,574,267 A | 3/1986 | Jones |
| 4,742,476 A | 5/1988 | Schwartz et al. |
| 5,061,917 A | 10/1991 | Higgs et al. |
| 5,109,213 A | 4/1992 | Williams |
| 5,463,374 A | 10/1995 | Mendez et al. |
| 5,517,853 A | 5/1996 | Chamussy |

(Continued)

FOREIGN PATENT DOCUMENTS

WO    WO 9805518 A1 *  2/1998

(Continued)

OTHER PUBLICATIONS

U.S. Appl. No. 10/064,691, filed Aug. 7, 2002, Talukder.

(Continued)

*Primary Examiner*—Eric M Blount
(74) *Attorney, Agent, or Firm*—Angela M. Brunetti; Frank MacKenzie

(57) ABSTRACT

A tire pressure monitoring system (12) for an automotive vehicle (10) has a receiver circuit (28). The vehicle (12) has a plurality of wheels (14A-14D). A plurality of antennas (31A-31D) are adjacent to one of the wheels (14A-14D). The plurality of antennas receive RF signals from a pressure sensor (16A). An adder circuit (30) is coupled to the receiver circuit and the plurality of antennas. The adder circuit receives the RF signals and adds them together to form a sum signal. The sum signal is coupled to the receiver circuit.

18 Claims, 3 Drawing Sheets

U.S. PATENT DOCUMENTS

| | | | |
|---|---|---|---|
| 5,569,848 A | 10/1996 | Sharp | |
| 5,583,482 A | 12/1996 | Chamussy et al. | |
| 5,587,698 A | 12/1996 | Genna | |
| 5,589,815 A | 12/1996 | Nishihara et al. | |
| 5,600,301 A | 2/1997 | Robinson, III | |
| 5,602,524 A | 2/1997 | Mock et al. | |
| 5,612,671 A | 3/1997 | Mendez et al. | |
| 5,656,993 A | 8/1997 | Coulthard | |
| 5,661,651 A | 8/1997 | Geschke et al. | |
| 5,717,376 A | 2/1998 | Wilson | |
| 5,721,528 A | 2/1998 | Boesch et al. | |
| 5,741,966 A | 4/1998 | Handfield et al. | |
| 5,790,016 A | 8/1998 | Konchin et al. | |
| 5,801,306 A | 9/1998 | Chamussy et al. | |
| 5,808,190 A | 9/1998 | Ernst | |
| 5,838,229 A | 11/1998 | Robinson, III | |
| 5,853,020 A | 12/1998 | Widner | |
| 5,880,363 A | 3/1999 | Meyer | |
| 5,913,240 A | 6/1999 | Drähne et al. | |
| 5,926,087 A | 7/1999 | Busch et al. | |
| 5,939,977 A | 8/1999 | Monson | |
| 5,959,202 A | 9/1999 | Nakajima | |
| 5,963,128 A | 10/1999 | McClelland | |
| 5,965,808 A | 10/1999 | Normann et al. | |
| 5,969,239 A | 10/1999 | Tromeur et al. | |
| 5,990,785 A | 11/1999 | Suda | |
| 5,999,091 A | 12/1999 | Wortham | |
| 6,002,327 A | 12/1999 | Boesch et al. | |
| 6,034,597 A * | 3/2000 | Normann et al. | 340/447 |
| 6,043,738 A | 3/2000 | Stewart et al. | |
| 6,046,672 A | 4/2000 | Pearman | |
| 6,078,252 A | 6/2000 | Kulczycki et al. | |
| 6,111,520 A | 8/2000 | Allen et al. | |
| 6,161,071 A | 12/2000 | Shuman et al. | |
| 6,199,575 B1 | 3/2001 | Widner | |
| 6,204,758 B1 | 3/2001 | Wacker et al. | |
| 6,218,936 B1 | 4/2001 | Imao | |
| 6,225,895 B1 | 5/2001 | Bigelow, Jr. | |
| 6,232,875 B1 | 5/2001 | DeZorzi | |
| 6,246,317 B1 | 6/2001 | Pickornik et al. | |
| 6,259,361 B1 | 7/2001 | Robillard et al. | |
| 6,271,748 B1 | 8/2001 | Derbyshire et al. | |
| 6,275,148 B1 | 8/2001 | Takamura | |
| 6,275,231 B1 | 8/2001 | Obradovich | |
| 6,278,363 B1 | 8/2001 | Bezek et al. | |
| 6,278,379 B1 | 8/2001 | Allen et al. | |
| 6,292,096 B1 | 9/2001 | Munch et al. | |
| 6,293,147 B1 | 9/2001 | Parker et al. | |
| 6,327,570 B1 | 12/2001 | Stevens | |
| 6,339,736 B1 | 1/2002 | Moskowitz et al. | |
| 6,369,703 B1 | 4/2002 | Lill | |
| 6,385,511 B1 | 5/2002 | Fondeur et al. | |
| 6,446,502 B1 | 9/2002 | Normann et al. | |
| 6,448,891 B2 | 9/2002 | Barnett | |
| 6,448,892 B1 | 9/2002 | Delaporte | |
| 6,453,737 B2 | 9/2002 | Young et al. | |
| 6,463,798 B2 | 10/2002 | Niekerk et al. | |
| 6,489,888 B1 * | 12/2002 | Honeck et al. | 340/442 |
| 6,498,967 B1 | 12/2002 | Hopkins et al. | |
| 6,518,876 B1 | 2/2003 | Marguet et al. | |
| 6,591,671 B2 | 7/2003 | Brown | |
| 6,612,165 B2 | 9/2003 | Juzswik et al. | |
| 6,631,637 B2 | 10/2003 | Losey | |
| 6,667,687 B1 * | 12/2003 | DeZorzi | 340/447 |
| 6,672,150 B2 | 1/2004 | Delaporte | |
| 6,694,807 B2 | 2/2004 | Chuang | |
| 6,745,624 B2 | 6/2004 | Porter | |
| 6,750,762 B1 | 6/2004 | Porter | |
| 6,771,169 B1 | 8/2004 | Kaminski | |
| 6,782,741 B2 | 8/2004 | Imbert | |
| 6,784,794 B1 | 8/2004 | McQuade | |
| 6,805,000 B1 | 10/2004 | Sheikh-Bahaie | |
| 6,850,155 B1 | 2/2005 | McQuade | |
| 6,900,725 B1 | 5/2005 | Berry | |
| 6,952,160 B1 | 10/2005 | Bennie | |
| 6,982,636 B1 | 1/2006 | Bennie | |
| 6,985,076 B1 | 1/2006 | Bennie | |
| 7,272,536 B2 * | 9/2007 | Potts | 702/185 |
| 2002/0008718 A1 | 1/2002 | Obradovich | |
| 2005/0011257 A1 | 1/2005 | Modawell | |
| 2005/0200464 A1 | 9/2005 | Bennie | |

OTHER PUBLICATIONS

U.S. Appl. No. 10/905,093, filed Dec. 15, 2004, Miller.
U.S. Appl. No. 10/908,430, filed May 11, 2005, McQuade.
U.S. Appl. No. 10/908,364, filed May 9, 2005, Phalak.
U.S. Appl. No. 11/161,835, filed Aug. 18, 2005, Miller.
U.S. Appl. No. 11/163,586, filed Oct. 24, 2005, Miller.

* cited by examiner

METHOD AND APPARATUS FOR RECEIVING SIGNALS FROM A SENSOR INTO A TIRE PRESSURE MONITORING SYSTEM

TECHNICAL FIELD

The present invention relates generally to a tire pressure monitoring system for an automotive vehicle, and more particularly, to a method and system for receiving signals from a pressure sensor.

BACKGROUND OF THE INVENTION

The National Highway Traffic Safety Administration is requiring a phase in of tire pressure monitoring systems in vehicles. Various types of pressure sensing systems for monitoring the pressure within the tires of an automotive vehicle have been proposed. Such systems generate a pressure signal using an electromagnetic (EM) signal which is transmitted to a receiver. The pressure signal corresponds to the pressure within the tire. When the tire pressure drops below a predetermined pressure, an indicator is used to signal the vehicle operator of the low pressure. Many vehicles require different tire pressures in the front of the vehicle and the rear of the vehicle. Therefore, it is important to know the relative position of the pressure sensor and thus the tires relative to the vehicle.

Proposed tire pressure monitoring systems use RF signals between a receiver and the pressure sensors. RF reception between the tire pressure monitoring sensors in each wheel and the tire pressure monitoring receiver is not always sufficient. RF reception between the tire pressure monitoring sensors and the receiver is not fully predictable during the design process of the vehicle. Robust designs require extensive in-vehicle testing of representative vehicles to establish the receiver location within or outside of the vehicle. Various impediments to the RF signals include the sheet metal, wiring variations, powertrain, and wheel configurations. Such designs are typically not available until late in the product development cycle. Using a conventional receiver located within or outside the vehicle and the various pressure monitoring systems may therefore be inhibited.

It would therefore be desirable to provide a system that prevents attenuation of the RF pressure sensor signal so that reliable pressure monitoring may be performed.

SUMMARY OF THE INVENTION

The present invention provides an antenna adjacent to each wheel such as in the wheel well close to the tire pressure monitoring transmitter. A cable is routed from each of the receiving antennas to an adder circuit which adds the output of each antenna together and provides the added or summed output to an antenna.

In one aspect of the invention, an adder circuit for coupling to a receiver having a receiver input comprises a parallel circuit comprising a plurality of branches in parallel with a receiver impedance. Each branch comprises an antenna output in series with a circuit element so that each antenna output is added together and provided to the receiver.

A method of operating a tire pressure monitoring system for a vehicle having a plurality of wheels includes the steps of providing a plurality of receiving antennas. Each of the plurality of antennas being adjacent to a respective one of the plurality of wheels. The method further includes generating RF signals at a pressure sensor at each wheel and coupling each of the RF signals to a respective one of the plurality of receiving antennas. The method further includes adding the output of the plurality of receiving antennas to form a sum signal and coupling the sum signal to a receiver circuit.

One advantage of the invention is that because the antenna is located near the RF source, distortion, or attenuation of the RF signal due to various design elements of the vehicle is minimized so that a reliable RF signal may be received.

Other advantages and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
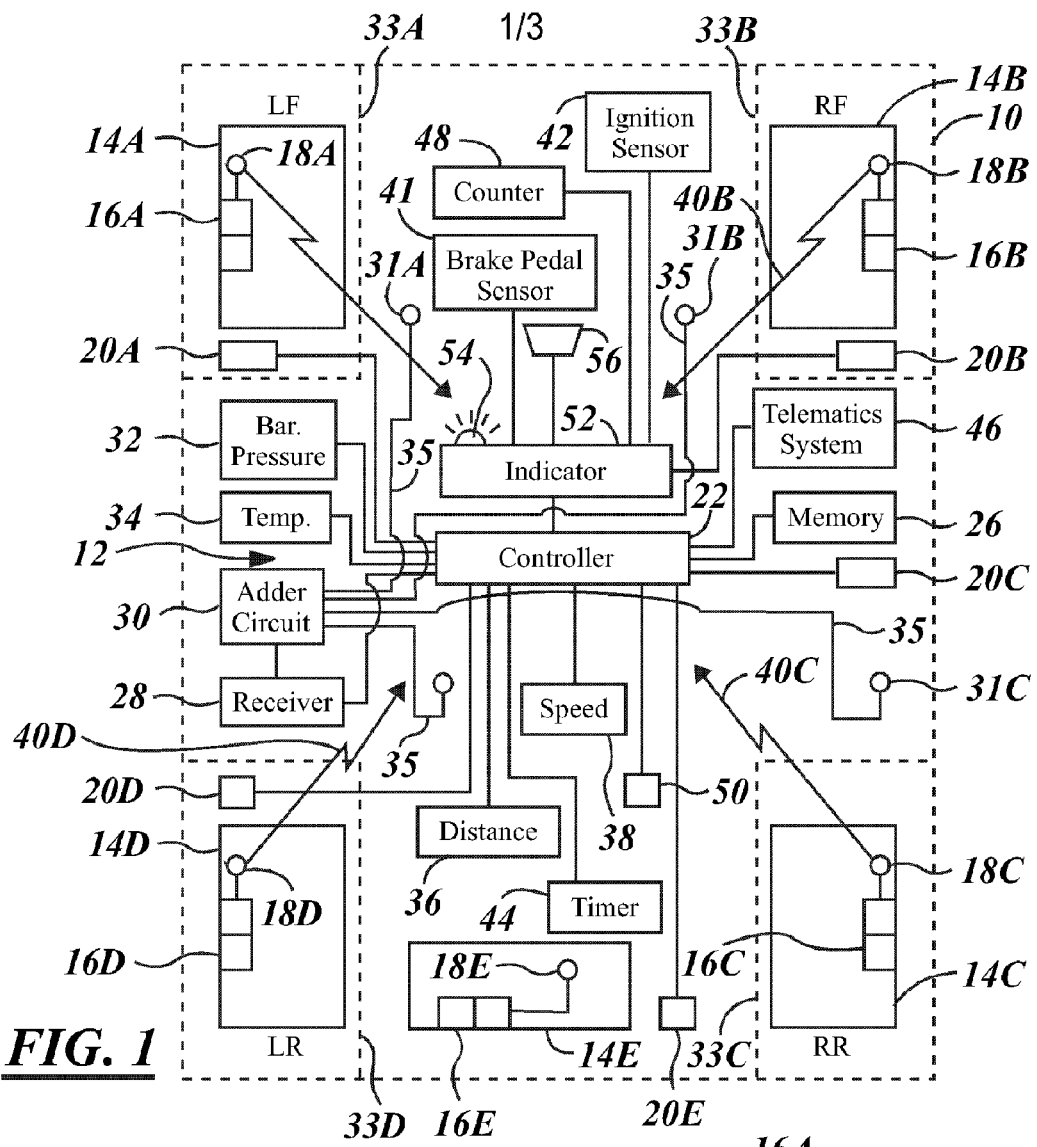
FIG. 1 is a block diagrammatic view of a pressure monitoring system according to the present invention.

In the following figures, the same reference numerals will be used to illustrate the same components. Those skilled in the art will recognize that the various components set forth herein could be changed without varying from the scope of the invention.

Referring now to FIG. 1, an automotive vehicle 10 has a pressure monitoring system 12 for monitoring the air pressure within a left front tire 14A, a right front tire 14B, a right rear tire 14C, and a left rear tire 14D. Each tire 14A-14D has a respective tire pressure sensor circuit 16A, 16B, 16C, and 16D, each of which has a respective antenna 18A, 18B, 18C, and 18D. Each tire is positioned upon a corresponding wheel.

A fifth tire or spare tire 14E is also illustrated having a tire pressure sensor circuit 16E and a respective antenna 18E. Although five wheels are illustrated, the pressure of various numbers of wheels may be increased. For example, the present invention applies equally to vehicles such as pickup trucks that have dual wheels for each rear wheel. Also, various numbers of wheels may be used in a heavy-duty truck application having dual wheels at a number of locations. Further, the present invention is also applicable to trailers and extra spares.

Each tire 14 may have a respective initiator 20A-20E positioned within the wheel wells adjacent to the tire 14. Initiator 20 generates a low frequency RF signal initiator and is used to initiate a response from each wheel so that the position of each wheel may be recognized automatically by the pressure monitoring system 12. Initiators 20A-20E are preferably coupled directly to a controller 22. In commercial embodiments where the position programming is done manually, the initiators may be eliminated.

Controller 22 is preferably a microprocessor-based controller having a programmable CPU that may be programmed to perform various functions and processes including those set forth herein.

Controller 22 has a memory 26 associated therewith. Memory 26 may be various types of memory including ROM or RAM. Memory 26 is illustrated as a separate component. However, those skilled in the art will recognize controller 22 may have memory 26 therein. Memory 26 is used to store various thresholds, calibrations, tire characteristics, wheel characteristics, serial numbers, conversion factors, temperature probes, spare tire operating parameters, and other values needed in the calculation, calibration and operation of the pressure monitoring system 12. For example, memory may contain a table that includes the sensor identification thereof. Also, the warning statuses of each of the tires may also be stored within the table.

Controller 22 is also coupled to a receiver 28. Although receiver 28 is illustrated as a separate component, receiver 28 may also be included within controller 22. Receiver 28 is coupled to an adder circuit 30, which in turn is coupled to antennas 31A-D positioned near, or adjacent to each wheel by a cable 35. Cable 35 may be a coaxial cable. One suitable location is in each wheel well 33A-D associated therewith. Receiver 30 is used to receive pressure and various information from tire pressure circuits 16A-16E in an added manner from the adder circuit 30. Controller 22 is also coupled to a plurality of sensors. Such sensors may include a barometric pressure sensor 32, an ambient temperature sensor 34, a distance sensor 36, a speed sensor 38, a brake pedal sensor 40, and an ignition sensor 42. Of course, various other types of sensors may be used. Barometric pressure sensor 32 generates a barometric pressure signal corresponding to the ambient barometric pressure. The barometric pressure may be measured directly, calculated, or inferred from various sensor outputs. The barometric pressure compensation is preferably used but is not required in calculation for determining the pressure within each tire 14. Temperature sensor 34 generates an ambient temperature signal corresponding to the ambient temperature and may be used to generate a temperature profile.

Distance sensor 36 may be one of a variety of sensors or combinations of sensors to determine the distance traveled for the automotive vehicle. The distance traveled may merely be obtained from another vehicle system either directly or by monitoring the velocity together with a timer 44 to obtain a rough idea of distance traveled. Speed sensor 38 may be a variety of speed sensing sources commonly used in automotive vehicles such as a two wheel used in anti-lock braking systems, or a transmission sensor.

Timer 44 may also be used to measure various times associated with the process set forth herein. The timer 44, for example, may measure the time the spare tire is stowed, measure a time after an initiator signal or measure the time and duration for transmitting an initiator signal.

Brake pedal sensor 41 may generate a brake-on or brake-off signal indicating that the brake pedal is being depressed or not depressed, respectively. Brake pedal sensor 41 may be useful in various applications such as the programming or calibrating of the pressure monitoring system 12.

Ignition sensor 42 may be one of a variety of types of sensors to determine if the ignition is powered on. When the ignition is on, a run signal may be generated. When the ignition is off, an off signal is generated. A simple ignition switch may act as an ignition sensor 42. Of course, sensing the voltage on a particular control line may also provide an indication of whether the ignition is activated. Preferably, pressure monitoring system 12 may not be powered when the ignition is off. However, in one constructed embodiment, the system receives information about once an hour after the ignition has been turned off.

A telemetric system 46 may be used to communicate various information to and from a central location from a vehicle. For example, the control location may keep track of service intervals and use and inform the vehicle operator service is required.

A counter 48 may also be included in control system 12. Counter 48 may count, for example, the number of times a particular action is performed. For example, counter 48 may be used to count the number of key-off to key-on transitions. Of course, the counting function may be inherent in controller 22.

Controller 22 may also be coupled to a button 50 or plurality of buttons 50 for inputting various information, resetting the controller 22, or various other functions as will be evident to those skilled in the art through the following description.

Controller 22 may also be coupled to an indicator 52. Indicator 52 may include an indicator light or display panel 54, which generates a visual signal, or an audible device 56 such as a speaker or buzzer that generates an audible signal. Indicator 52 may provide some indication as to the operability of the system such as confirming receipt of a signal such as a calibration signal or other commands, warnings, and controls as will be further described below. Indicator 52 may be an LED or LCD panel used to provide commands to the vehicle operator when manual calibrations are performed.

Figure 2:
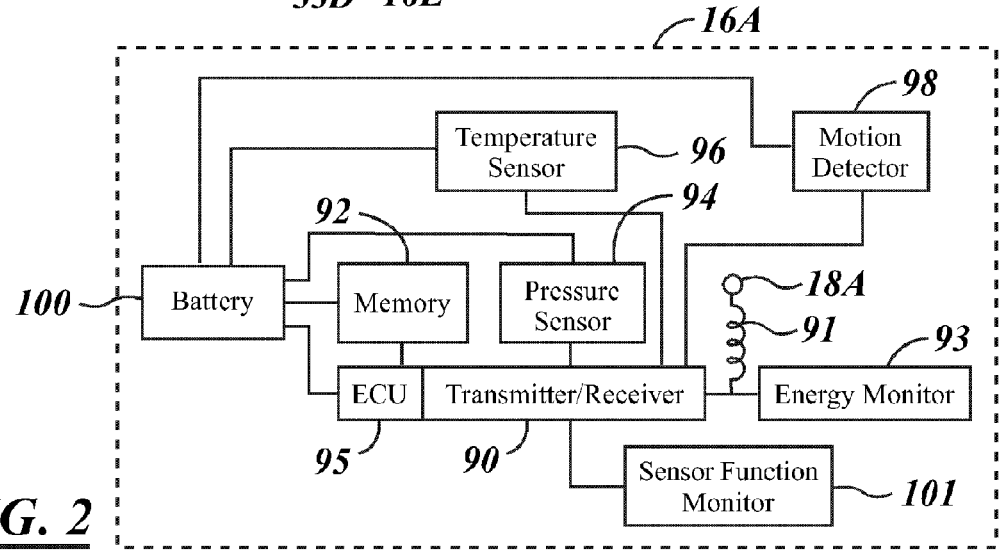
FIG. 2 is a block diagrammatic view of a pressure transmitter according to the present invention.

Referring now to FIG. 2, a typical tire pressure sensor circuit 16a is illustrated. Although only one tire pressure sensor circuit 16 is shown, each may be commonly configured. Pressure monitoring system 12 has a transmitter/receiver or transceiver 90. Transmitter/receiver 90 is coupled to antenna 18A for transmitting various information to receiver 28. The antenna 18 may, for example, be a coil and thus a sensor coil. An energy monitor circuit 93 may be a separate circuit or included in transmitter/receiver 90. The circuit 93 is used to determine an amount of energy in the coil. The energy is energy induced from the initiator. The receiver portion may be used to receive an activation signal for an initiator located at each wheel. The pressure sensor may have various information such as a memory 92, a pressure sensor 94 for determining the pressure within the tire, a temperature sensor 96 for determining the temperature within the tire, and a motion detector 98 which may be used to activate the system pressure sensing system. The initial message is referred to as a "wake" message, meaning the pressure sensing circuit is now activated to send its pressure transmissions and the other data. An electronic control unit (ECU) 95 may be coupled within the circuit to perform various calculations including a pressure calibration calculation.

Memory 92 may include various information such as a serial number, calibration data, and the like.

Each of the transceiver 90, memory 92, pressure sensor 94, ECU 95, temperature sensor 96, and motion sensor 98 are coupled to battery 100. Battery 100 is preferably a long-life battery capable of lasting through the life of the tire.

A sensor function monitor 101 may also be incorporated into tire pressure sensor circuit 16. Sensor function monitor 101 generates an error signal when various portions of the tire pressure circuit are not operating or are operating incorrectly. Also, sensor function monitor may generate a signal indicating that the circuit 16 is operating normally.

Figure 3:
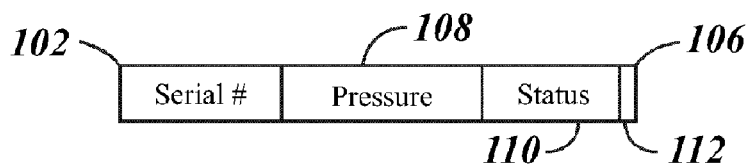
FIG. 3 is a diagrammatic view of a digital word from a pressure transmitter.

Referring now also to FIG. 3, a word 102 generated by the tire pressure sensor circuit 16 of FIG. 2 is illustrated. Word 102 may comprise a transmitter identification serial number portion 104 followed by a data portion 106 in a predetermined format. For example, data section 106 may include a pressure information 108 followed by a plurality of status bits 110. The status bits 110 may include a range portion 112 having one or two bits indicative of a range. Motion detector 28 may initiate the transmission of the word 102 to the transmitter/receiver 90. The word 102 is preferably such that the receiver 28 is able to decode the information and validate the word while providing the identification number or serial number, the pressure, the temperature, status and a sensor function.

Figure 4:
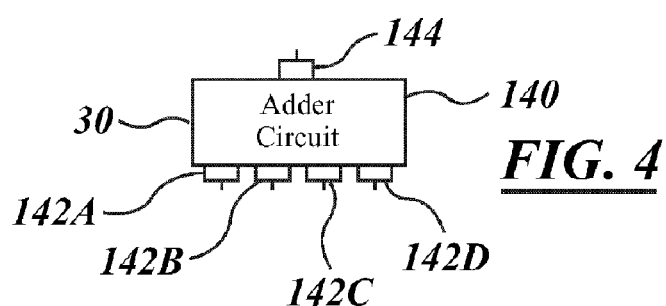
FIG. 4 is a plot of sensor element output versus applied pressure for a system in which the calibration is performed for two different ranges of outputs.

Referring now to FIG. 4, adder circuit 30 is shown in further detail. Adder circuit 30 may include a housing 140 and coaxial cable inputs 142A, 142B, 142C, and 142D. Each coaxial cable input is coupled to a respective antenna 31A-31D. The adder circuit 130 is also coupled to the receiver 28 through another coaxial cable 144. Of course, the adder circuit and receiver may be located in the same housing and thus a separate coaxial cable may not be required.

Figure 5:
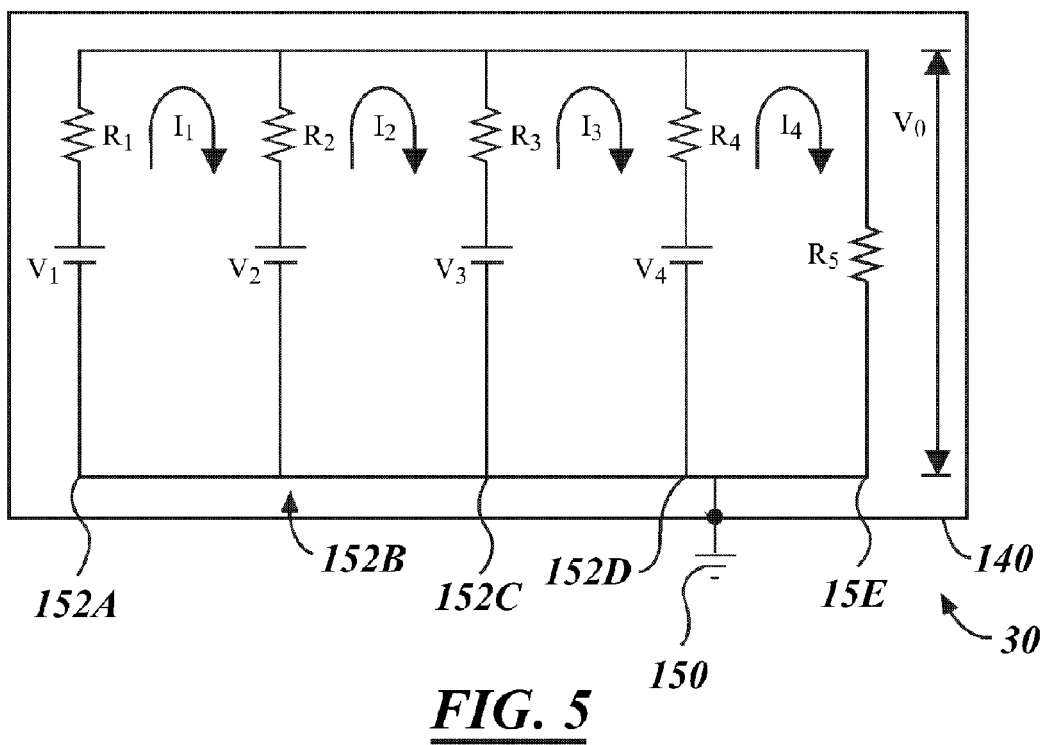
FIG. 5 is a sensor element versus applied pressure plot of a three-calibration plot.

Referring now to FIG. 5, the adder circuit 30 is illustrated in further detail. Adder circuit 30 is shown with the housing 140 therearound. The housing 140 is preferably a metallic housing and is coupled to the ground 150. The ground is the same common ground used in the adder circuit. The adder circuit is formed of a plurality of branches 152A, 152B, 152C, 152D, and 152E. Each of the adder branches is coupled in parallel. Each of the parallel branches has the respective input from the antenna represented by V elements $V_1$-$V_4$. The antenna outputs $V_1$-$V_4$ are coupled in series with a circuit element. The circuit element in this case is modeled by a resistor $R_1$-$R_4$. Thus, branch 152A includes a series combination of $R_1$ and the output of the antenna $V_1$. The branch 152B is set forth as $R_2$ in series with $V_2$. Branches 142C and 142D are likewise configured. The output of the circuit $V_0$ is the addition of each of the branches. It should be noted that the current through each of the branches is represented by $I_1$-$I_4$. That is, the loop between the first two branches is illustrated by the current $I_1$, the current between the second two branches is represented by $I_2$, the branch between the third and fourth branches is represented by $I_3$, and the current between the fourth branch and the input of the receiver R5 is represented by $I_4$. It should be noted that the receiver impedance is illustrated by the resistor $R_5$. $V_{out}$ may use circuit analysis in each loop to determine the output as:

$$V_0 = -I_4 R_5$$
$$V_0 = (I_4 - I_3)R_4 + V_4$$
$$V_0 = (I_3 - I_2)R_3 + V_3$$
$$V_0 = (I_2 - I_1)R_2 + V_2$$
$$V_0 = I_1 R_1 + V_1$$

which when combined simplifies to:

$$V_0 = \frac{V_1 \frac{R_2}{R_1} + V_2 + V_3 \frac{R_2}{R_3} + V_4 \frac{R_2}{R_5}}{1 + \frac{R_2}{R_3} + \frac{R_2}{R_4} + \frac{R_2}{R_5} + \frac{R_2}{R_1}}$$

and when $R_1=R_2=R_3=R_4=R_5$, the above simplifies to:

$$\frac{\sum V_i}{5}$$

or $$\frac{\sum V_i}{N_v + 1}$$

Figure 6:
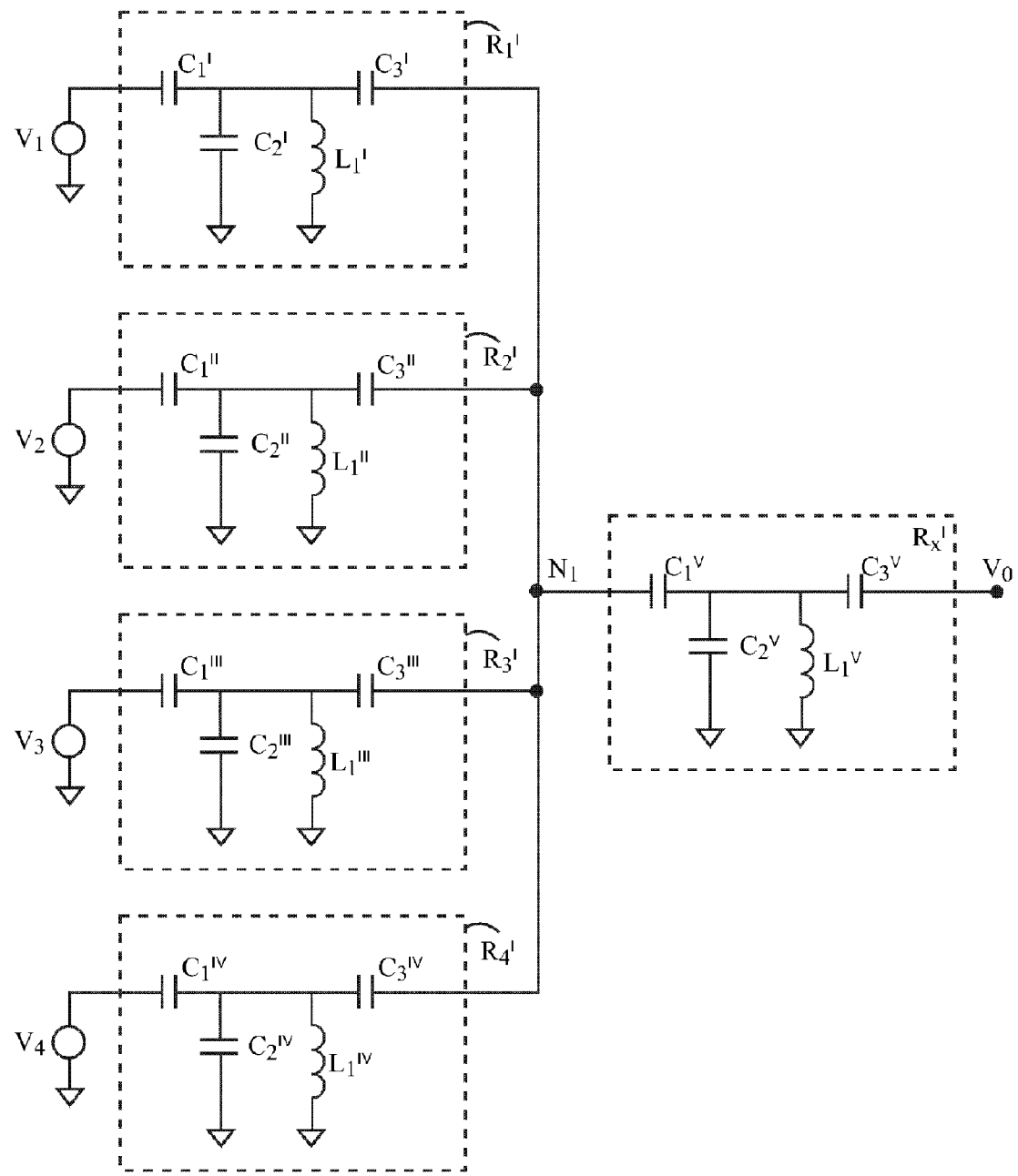
FIG. 6 is a flow chart illustrating a method of operating a tire pressure monitoring system according to the present invention.

Referring now to FIG. 6, each of the resistive elements $R_1$-$R_4$ may be modeled by a reactive element $R_1'$-$R_4'$. Each of the reactive elements (only one of which will be described since each are preferably the same) includes a capacitor $C_1$, coupled to the output voltage of the respective antenna. The capacitor is coupled in series with the parallel combination of a capacitor $C_2$ and an inductor $L_1$. The parallel combination of $C_2$ and $L_1$ are coupled in series with a third capacitor $C_3$. The output of the $C_3$ capacitors in each of the branches is coupled to a common node $N_1$. The common node $N_1$ is thus coupled again to another reactive element $R_x'$. The reactive element $R_x'$ includes the same combination of a capacitor in series with the parallel combination of a second capacitor and an inductor, which in turn is in series with a third capacitor. The third capacitor in this case, however, is coupled to $V_{out}$. Thus, the output of $V_{out}$ is the sum of the antennas $V_1$-$V_4$.

It should be noted that various types of reactive elements may be provided. For example, only a capacitor or only an inductor may be provided, a parallel combination of a capacitor and an inductor may be provided. Also, one or more of the capacitors $C_1$ or $C_3$ may be eliminated. Additional elements or elimination of various elements $C_1$, $C_2$, $L_1$, or $C_3$ may be provided based upon the desired characteristics of the signal. Also, some filtering may also be provided in the reactive circuits. Each reactive element preferably has the same reactants as the input stage of the receiver used. This allows simplification of the above formula.

While particular embodiments of the invention have been shown and described, numerous variations and alternate embodiments will occur to those skilled in the art. Accordingly, it is intended that the invention be limited only in terms of the appended claims.

What is claimed is:

1. An adder circuit of a tire pressure monitoring system for coupling to a receiver having a receiver impedance comprising:
   a parallel circuit comprising a plurality of branches in parallel with a receiver impedance, each branch comprising an antenna output in series with a circuit element so that each antenna output is added together and provided to the receiver; wherein the circuit element comprises a first capacitor in parallel with an inductor.

2. An adder circuit as recited in claim 1 wherein each circuit element has a resistance approximately equal to the receiver impedance.

3. An adder circuit of a tire pressure monitoring system for coupling to a receiver having a receiver impedance comprising:
   a parallel circuit comprising a plurality of branches in parallel with a receiver impedance each branch comprising an antenna output in series with a circuit element so that each antenna output is added to ether and provided to the receiver; wherein the circuit element comprises a resistor.

4. An adder circuit as recited in claim 1 wherein the circuit element comprises a series combination of a second capacitor in series with a parallel combination of said first capacitor and said inductor.

5. An adder circuit as recited in claim 1 wherein the circuit element comprises a series combination of a second capacitor in series with a parallel combination of said first capacitor and said inductor and in further series combination with a third capacitor.

6. A tire pressure monitoring system having a receiver circuit for a vehicle having a plurality of wheels comprising:
   a plurality of antennas, each of the plurality of antennas being adjacent to a respective one of the plurality of wheels, said plurality of antennas receiving RF signals from a respective one of a plurality of RF transmitters;
   an adder circuit coupled to said receiver circuit and the plurality of antennas, said adder circuit receiving said RF signals and adding them together to form a sum signal, said sum signal coupled to said receiver circuit; wherein said adder circuit comprises a first capacitor in parallel with an inductor.

7. A tire pressure monitoring system as recited in claim 6 further comprising a metal housing coupled to a ground circuit, said adder circuit disposed within the housing.

8. A tire pressure monitoring system as recited in claim 6 further comprising a plurality of coaxial connectors coupled to the housing receiving a respective one of the RF signals.

9. A tire pressure monitoring circuit as recited in claim 6 wherein the adder circuit is simultaneously coupled to each of the plurality of antennas.

10. A method for operating a tire pressure monitoring system for a vehicle having a plurality of wheels comprising:
    providing a plurality of receiving antennas, each of the plurality of antennas being adjacent to a respective one of the plurality of wheels;
    generating RF signals at a pressure sensor at each wheel;
    coupling each of the RF signals to a respective one of the plurality of receiving antennas;
    adding the output of the plurality of receiving antennas to form a sum signal; wherein adding comprises coupling each antenna output in series with a circuit element; and coupling the sum signal to a receiver circuit.

11. A method as recited in claim 10 wherein said circuit element comprises either a resistor or a first capacitor in parallel with an inductor.

12. A method as recited in claim 10 wherein said circuit element comprises a series combination of a second capacitor in series with a parallel combination of a first capacitor and an inductor.

13. A method as recited in claim 10 wherein the circuit element comprises a series combination of a second capacitor in series with a parallel combination of a first capacitor and an inductor and in further series combination with a third capacitor.

14. A method as recited in claim 10 wherein the receiver has a receiver impedance, wherein each circuit element has an impedance substantially equal to the receiver impedance.

15. A method as recited in claim 10 wherein adding comprises coupling each antenna output in series with a first reactive element, the parallel combination of which is coupled in series with a second reactive element.

16. A method as recited in claim 15 wherein the first and second reactive circuit element comprises a first capacitor in parallel with an inductor.

17. A method as recited in claim 15 wherein the first and second reactive circuit element comprises a series combination of a second capacitor in series with a parallel combination of a first capacitor and an inductor.

18. A method as recited in claim 15 wherein the first and second reactive circuit element comprises a series combination of a second capacitor in series with a parallel combination of a first capacitor and an inductor and in further series combination with a third capacitor.

* * * * *